United States Patent
Masago (10) Patent No.: US 9,031,739 B2
(45) Date of Patent: May 12, 2015

(54) METHOD FOR DETERMINING INNER FAILURE OF TIRE

(75) Inventor: Takeshi Masago, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/805,430

(22) PCT Filed: Dec. 3, 2010

(86) PCT No.: PCT/JP2010/071651
§ 371 (c)(1),
(2), (4) Date: Feb. 4, 2013

(87) PCT Pub. No.: WO2011/161844
PCT Pub. Date: Dec. 29, 2011

(65) Prior Publication Data
US 2013/0131915 A1    May 23, 2013

(30) Foreign Application Priority Data

Jun. 24, 2010   (JP) ................... 2010-143792

(51) Int. Cl.
*B60C 19/00*        (2006.01)
*G01M 17/02*        (2006.01)

(52) U.S. Cl.
CPC ............ *B60C 19/00* (2013.01); *G01M 17/02* (2013.01); *B60C 2019/004* (2013.04)

(58) Field of Classification Search
USPC ....................................................... 701/33.9
See application file for complete search history.

(56) References Cited

U.S. PATENT DOCUMENTS

| 7,203,579 B2 * | 4/2007 | Yokota et al. ........... 701/29.2 |
| 2007/0164853 A1 | 7/2007 | Matsuda et al. |

(Continued)

FOREIGN PATENT DOCUMENTS

| JP | 2004-069462 A | 3/2004 |
| JP | 2005-067447 A | 3/2005 |

(Continued)

OTHER PUBLICATIONS

International Search Report for PCT/JP2010/071651 dated Dec. 28, 2010.

(Continued)

*Primary Examiner* — John Q Nguyen
*Assistant Examiner* — Kyung Kim
(74) *Attorney, Agent, or Firm* — Sughrue Mion, PLLC (57) ABSTRACT

A method for accurately determining internal failures, such as separations, of a tire without affecting tire behaviors. Radial acceleration signals of a tire during vehicular travel are detected by an acceleration sensor (11) attached to the inner surface of the tire at the axial center of the tread. A frequency analysis is performed on the radial acceleration signals to obtain a frequency spectrum. A band value $X_{ab}$ is calculated of a specific frequency band $[f_a, f_b]$ within the range of 100 Hz-400 Hz, which includes the frequency of the second lowest peak of the peaks appearing in the frequency spectrum. Then a check is made to see whether or not the difference between this band value $X_{ab}$ and a predetermined band value $Y_{ab}$ of a normal tire exceeds a threshold value K. And when $Y_{ab} - X_{ab} > K$, it is determined that an internal failure, such as a separation, is present in the tire.

6 Claims, 8 Drawing Sheets

(56) References Cited

U.S. PATENT DOCUMENTS

2007/0174002 A1* 7/2007 Kitazaki et al. ............... 701/70
2007/0194002 A1   8/2007 Fisher et al.
2008/0015763 A1   1/2008 Kitazaki et al.

FOREIGN PATENT DOCUMENTS

| JP | 2005-238928 A | 9/2005 |
|---|---|---|
| JP | 2007-64877 A | 3/2007 |
| JP | 2007-168671 A | 7/2007 |
| JP | 2007-191038 A | 8/2007 |
| JP | 2008-39769 A | 2/2008 |
| JP | 2009-166745 A | 7/2009 |
| JP | 2010-190787 A | 9/2010 |

OTHER PUBLICATIONS

International Preliminary Report on Patentability, dated Jan. 24, 2013, issued in International Application No. PCT/JP2010/071651.
Chinese Office Action dated Oct. 10, 2014 issued in corresponding Chinese Patent Application No. 201080068715.0.

* cited by examiner

NORMAL TIRE

FIG. 5(B)

FAULTY TIRE

METHOD FOR DETERMINING INNER FAILURE OF TIRE

CROSS REFERENCE TO RELATED APPLICATIONS

This application is a National Stage of International Application No. PCT/JP2010/071651 filed Dec. 3, 2010, claiming priority based on Japanese Patent Application No. 2010-143792 filed Jun. 24, 2010, the contents of all of which are incorporated herein by reference in their entirety.

TECHNICAL FIELD

The present invention relates to a method for determining the presence of internal failure, such as a separation, of a tire during vehicular travel.

BACKGROUND ART

A tire has a laminated structure of carcass plies and belts, which are fiber or metallic cord members each coated with rubber. As a result, if an excessive load works in the adhesion areas of those members during vehicular travel, a phenomenon called "socketing" can occur in which cord ends and coating rubber separate from each other to cause cracks in the rubber. If the socketing occurring at various circumferential points of a tire are allowed to link together, they will cause a separation of the laminated members from each other.

If the separation spreads circumferentially or axially in the tire, there will be increased chances of tire burst occurring during vehicular travel.

Hence, it is desired that a technology be developed for detecting any separation early and warning the driver of an imminent tire burst before it occurs.

There are various methods proposed in the art for detecting internal failures, such as separations, of tires. In one of them (see Patent Document 1, for instance), a temperature sensor is embedded in the shoulder area which is prone to internal failures of the tire. Then the temperatures of the tire during vehicular travel are measured, and an internal failure of the tire is detected from the change in the temperature. This method makes use of temperature rise near the point of failure due to the local heating resulting from an internal failure of a tire. More specifically, an internal failure of a tire is detected by detecting a temperature rise in the tread before any peeling (separation) occurs.

In another proposed method for detecting internal failures of a tire (see Patent Document 2, for instance), temperature-sensitive ferrite pieces having a Curie point in a predetermined temperature range are disposed at a predetermined pitch along the circumference of the annular portion of a tire. Also, installed on the vehicle body side are a magnet forming an annular magnetic path intersecting with the annular portion of the tire and a coil wound around the outer periphery of the annular magnetic path. And electromotive forces excited in the coil by the changes in flux density associated with the revolution of the tire are measured, and deformation in the shoulder area of the tire is indirectly detected from the measured waveform, thereby detecting an internal failure of the tire.

PRIOR ART DOCUMENT

Patent Document

Patent Document 1: Japanese Unexamined Patent Application Publication No. 2005-67447

Patent Document 2: Japanese Unexamined Patent Application Publication No. 2004-69462

SUMMARY OF THE INVENTION

Problem to be Solved by the Invention

However, in the method using a temperature sensor embedded in a tire, the sensor is buried in the rubber of the shoulder area near the belt ends where a separation can occur. Thus the boundary interface between the sensor and the surrounding rubber can become a starting point of a new crack in the rubber, which may lead to a tire failure. Moreover, the necessity for a measuring system for extracting outputted signals may add to the complexity of the apparatus.

Also, the method using sensitive ferrite pieces embedded in the shoulder area requires a number of sensitive ferrite pieces embedded along the circumference of the shoulder area which is prone to separations. Such a requirement is not desirable from a practical point of view. Also, the electromotive force excited in the coil varies with the change in the distance (gap) between the sensitive ferrite and the yoke when there is much input to the tire caused by the revolution speed of the tire. Therefore, it is difficult to detect the electromotive force with a measure of stability.

The present invention has been made to solve the foregoing problems with such conventional methods, and an object thereof is to provide a method for accurately determining internal failures, such as separations, of a tire without affecting tire behaviors.

Means for Solving the Problem

The inventor conducted an investigation on the ground contact performance of tires without internal failure such as a separation (normal tires) and tires having a separation (faulty tires) and came to a realization that the faulty tires tend to have shorter ground contact length in the tread center area.

Figure 9A:
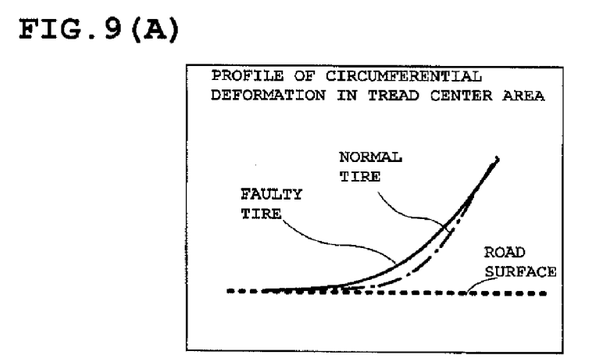
FIG. 9 is diagrams showing profiles of circumferential deformation in the tread center area.
Figure 9B:
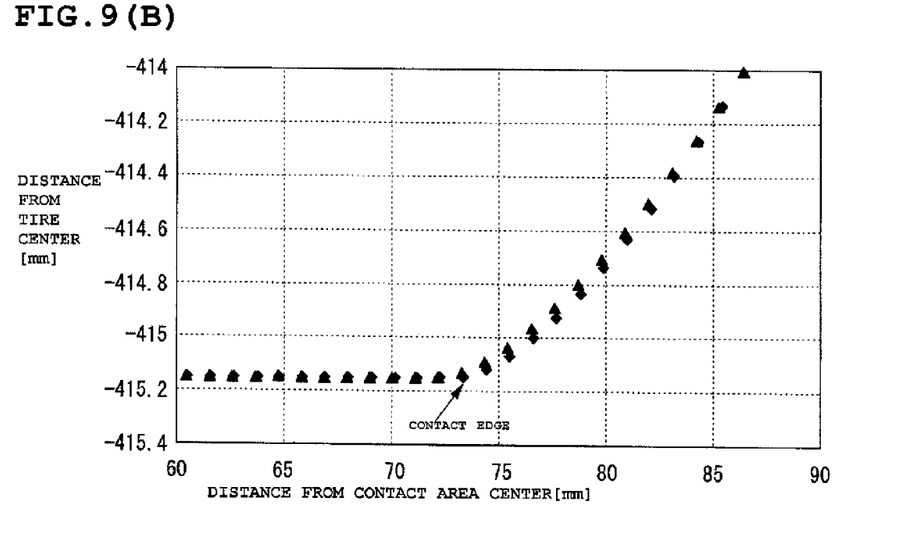

FIGS. 9A and 9B are diagrams showing the profiles of circumferential deformation of tires in the tread center area. FIG. 9A is a pattern diagram, and FIG. 9B is a diagram showing the results of confirming by an analysis on the conjecture as shown in the pattern diagram. Also, note that in FIG. 9A, the solid line represents the profile of circumferential deformation of the faulty tire and the chain line that of the normal tire. It is assumed that the ground contact length in the tread center area of faulty tires gets shorter as shown because of a reduced amount of radially outward swell of the tires due to a separation.

Figure 10:
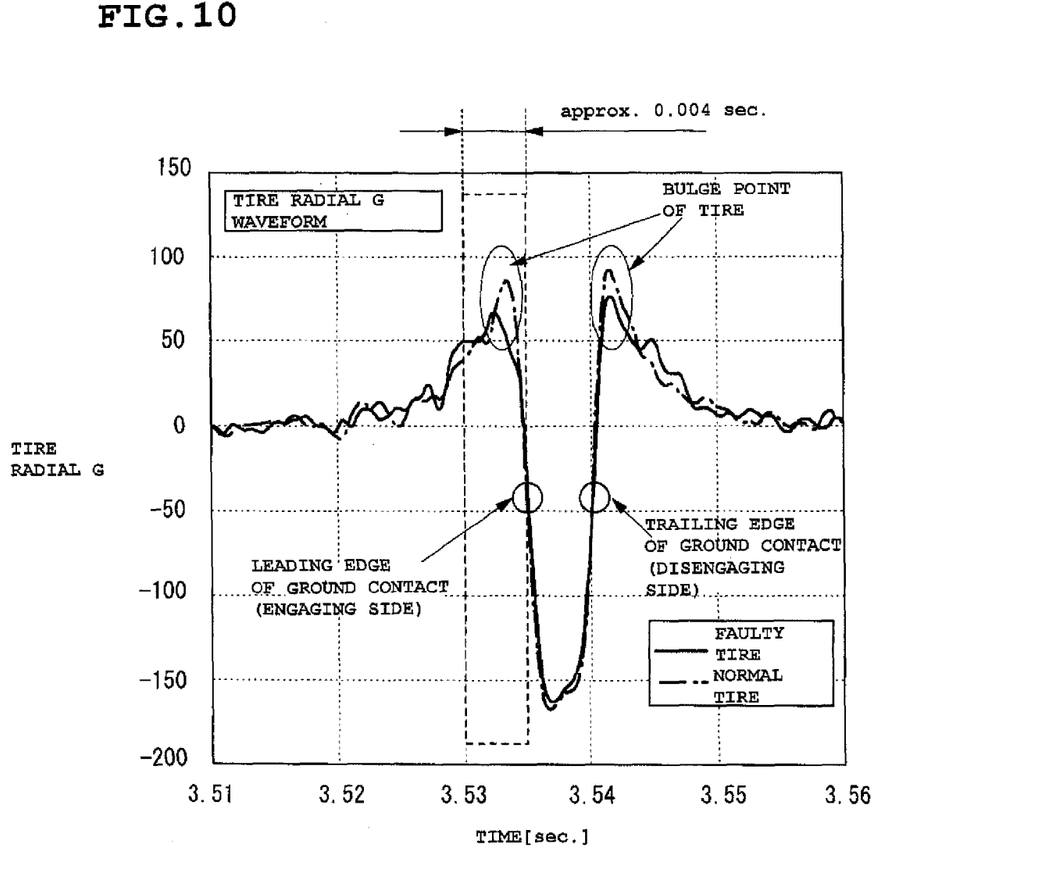
FIG. 10 is a diagram showing examples of radial acceleration waveforms in the tread center area.

Also, FIG. 10 is a diagram showing examples of radial acceleration waveforms of tires in the tread center area when the vehicular speed is 80 km/hr. Comparison between the radial acceleration waveform of the normal tire represented by a chain line and that of the faulty tire represented by a solid line indicates that the peak levels at the bulge points (points outside the contact area where the tire swells outward most) are lower for the faulty tire.

In FIG. 10, since the period for the peak of a bulge point is approximately 0.004 sec., the frequency of the vibrations near the bulge point is estimated to be 240 Hz to 250 Hz. The frequency range containing these frequencies is the frequency band containing the frequency of the second highest peak of the peaks appearing in the frequency spectrum obtained by performing a frequency analysis on the time-series waveform of radial acceleration of the tire.

Therefore, it is possible to accurately determine whether an internal failure is occurring in a tire or not by comparing the magnitude of vibration components of the frequency range containing the frequency of the second highest peak of the peaks appearing in the frequency spectrum obtained by performing a frequency analysis on the tire vibrations in the tread center area during vehicular travel with that of the vibration components of a normal tire.

Accordingly, the present invention provides a method for determining an internal failure, such as a separation, of a tire during vehicular travel. And the method includes the steps of detecting radial acceleration of a tire during vehicular travel by an acceleration sensor installed on the inner surface of the tire in the tread center area, calculating a band value, which is a magnitude of vibrational components in a specific frequency band, from the detected radial acceleration, comparing the calculated band value against a predetermined band value of a normal tire, and determining the presence of an internal failure of the tire when the calculated band value is smaller than the band value of the normal tire. In this method, the specific frequency band is a frequency band which includes the frequency of the second lowest peak of the peaks appearing in the frequency spectrum derived by performing a frequency analysis on the radial acceleration.

Thus, it is possible to accurately determine whether an internal failure of a tire has occurred or not without affecting the tire behaviors. And this will improve the running safety of the vehicle.

It is to be noted that the lowest peak of vibrations appearing in the above-mentioned frequency spectrum is the peak of vibrations attributable to the unevenness of the road surface or the characteristic vibration (near 40 Hz) of the tire. The second lowest peak to be used in this invention is the peak of vibrations corresponding to the frequencies of vibrations near the above-mentioned bulge points.

The tread center area is a term used in contrast to the shoulder areas of a tire, meaning the region of the tread axially inside of the shoulder grooves.

Also, the term "separation" generally refers to a phenomenon of tire damage in which rubber peels from belt or rubber peels from rubber. As used herein, "separation" also includes the phenomenon of socketing in which a cord end separates from coating rubber.

Also, the present invention provides a method for determining an internal failure of a tire, in which the specific frequency band is within a range of 100 Hz to 400 Hz.

Accordingly, a band value covering the frequency components of vibrations near the bulge points can be calculated reliably.

Also, the present invention provides a method for determining an internal failure of a tire, in which the specific frequency band is changed relative to the vehicular speed.

Accordingly, the frequency band for calculating a band value can be set narrower, so that the accuracy of determining an internal failure of a tire can be improved.

Also, the present invention provides a method for determining an internal failure of a tire, in which the band value is either one of a leading-edge side band value, calculated from a time-series waveform of the leading-edge region which includes a leading-edge peak occurring when the tire engages with the ground, and a trailing-edge side band value, calculated from a time-series waveform of the trailing-edge region which includes a trailing-edge peak occurring when the tire disengages from the ground, or the sum of the leading-edge side band value and the trailing-edge side band value, of the time-series waveform of the radial acceleration.

As described above, use of the acceleration waveform in the time domain including the peak of vibrations near the bulge point only will produce a marked difference between the band values. And this will improve the accuracy of determining internal failures of a tire.

It is to be understood that the foregoing summary of the invention does not necessarily recite all the features essential to the invention, and subcombinations of all these features are intended to be included in the invention.

BEST MODE FOR CARRYING OUT THE INVENTION

Figure 1:
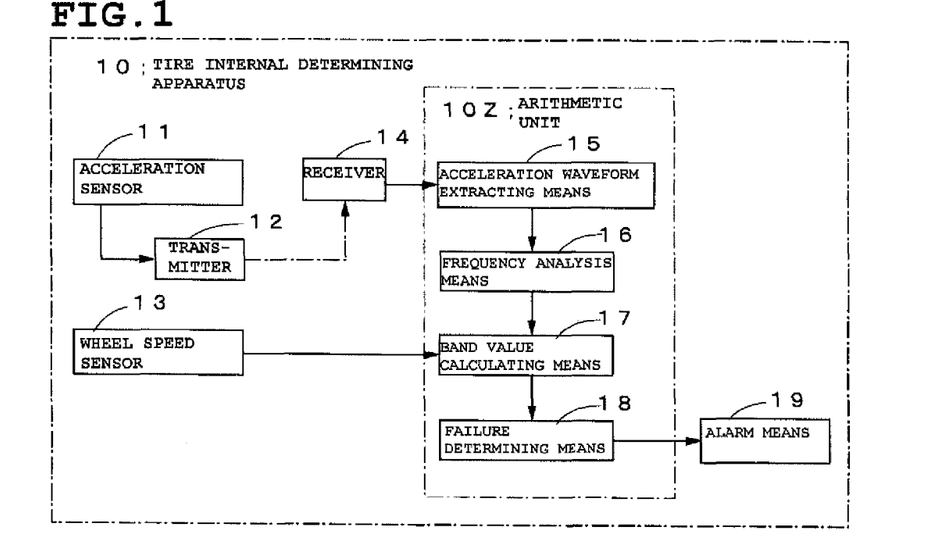
FIG. 1 is a diagram showing a structure of a tire internal failure determining apparatus according to an embodiment of the invention.

FIG. 1 is a diagram showing a structure of a tire internal failure determining apparatus 10. The tire internal failure determining apparatus 10 includes an acceleration sensor 11, a transmitter 12, a wheel speed sensor 13, a receiver 14, an acceleration waveform extracting means 15, a frequency analysis means 16, a band value calculating means 17, a failure determining means 18, and an alarm means 19.

The acceleration waveform extracting means 15, the frequency analysis means 16, the band value calculating means 17, and the failure determining means 18 constitute an arithmetic unit 10Z. The arithmetic unit 10Z, which runs on microcomputer software, is installed near the driver's seat of a vehicle.

Figure 2:
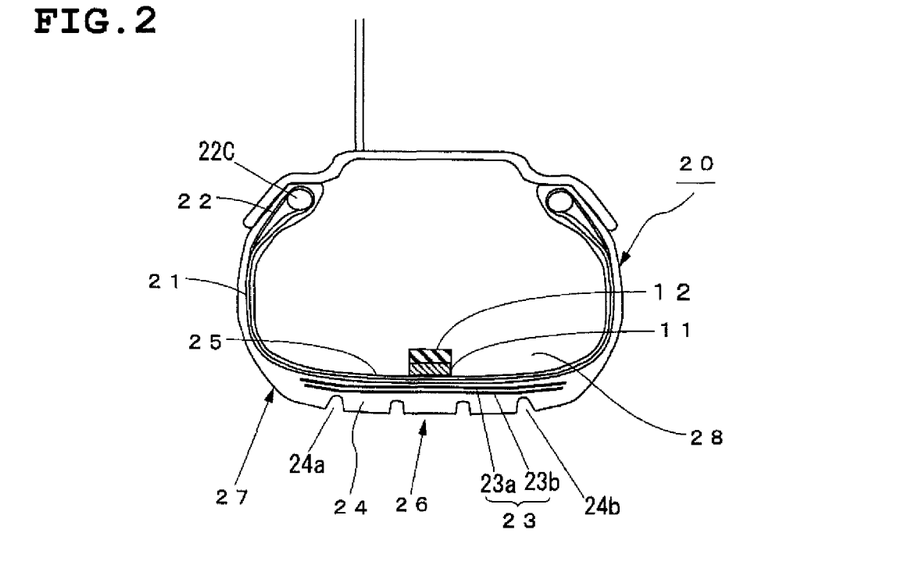
FIG. 2 is an illustration showing a structure of a tire and the location of an acceleration sensor.

The acceleration sensor 11, which is disposed in the axial center area on the tire air chamber 28 side of the inner liner 25 of a tire 20 as shown in FIG. 2, detects vibrations entering the tread 24 of the tire 20. In this exemplary embodiment, the acceleration sensor 11 is so oriented as to detect the tread vibrations inputted from the road surface in a radial direction of the tire.

The transmitter 12, which is disposed integrally with the acceleration sensor 11, transmits output signals from the acceleration sensor 11 to the receiver 14 installed on the vehicle body.

The wheel speed sensor 13 detects the revolution speed of a wheel (hereinafter referred to as "wheel speed"). The wheel speed sensor 13 in this embodiment has a rotor with gear teeth around its periphery and rotating along with the wheel, a yoke creating a magnetic circuit in combination with the rotor, and a coil for detecting changes in magnetic flux of the magnetic circuit. This is a widely-known electromagnetic induction type wheel speed sensor capable of detecting the angle of rotation of a wheel. The yoke and the coil are mounted on a not-shown knuckle. The data on wheel speed detected by the wheel speed sensor 13 is sent to the band value calculating means 17.

The receiver 14 receives output signals of the acceleration sensor 11 transmitted from the transmitter 12 and sends them to the acceleration waveform extracting means 15.

Figure 3A:
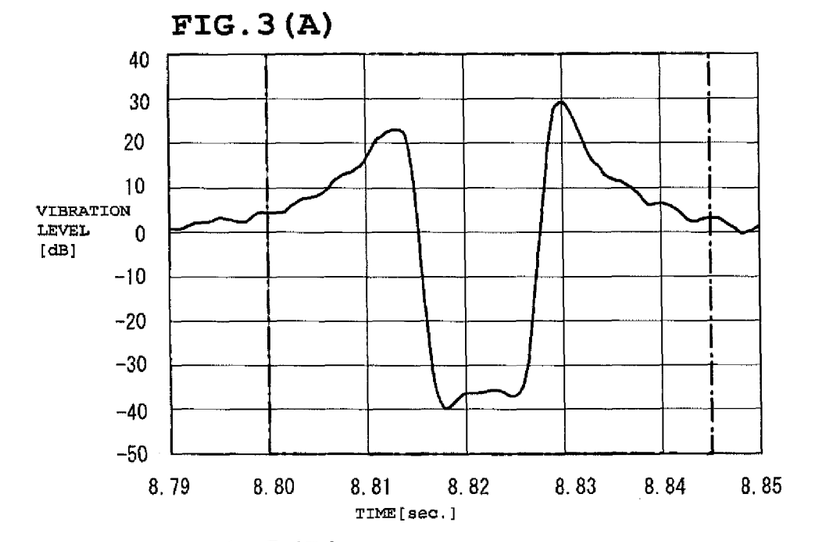
FIG. 3 is a diagram showing a time-series waveform of radial acceleration of a tire and a diagram showing an example of a frequency spectrum therefor.

The acceleration waveform extracting means 15 extracts a time-series waveform of the radial acceleration of the tire (hereinafter referred to as "acceleration waveform") as shown in FIG. 3A from the output signals of the acceleration sensor 11. The horizontal axis of the time-series waveform is time (sec.), and the vertical axis is the vibration level (dB) which is the magnitude of acceleration.

The earlier peak appearing in the time-series waveform is the leading-edge peak that occurs when the tire 20 engages with the road surface, and the next peak is the trailing-edge peak that occurs when the tire 20 disengages from the road surface. And the region between the leading-edge peak and the trailing-edge peak where the vibration level is low is the region where the tire is in contact with the ground surface.

Figure 3B:
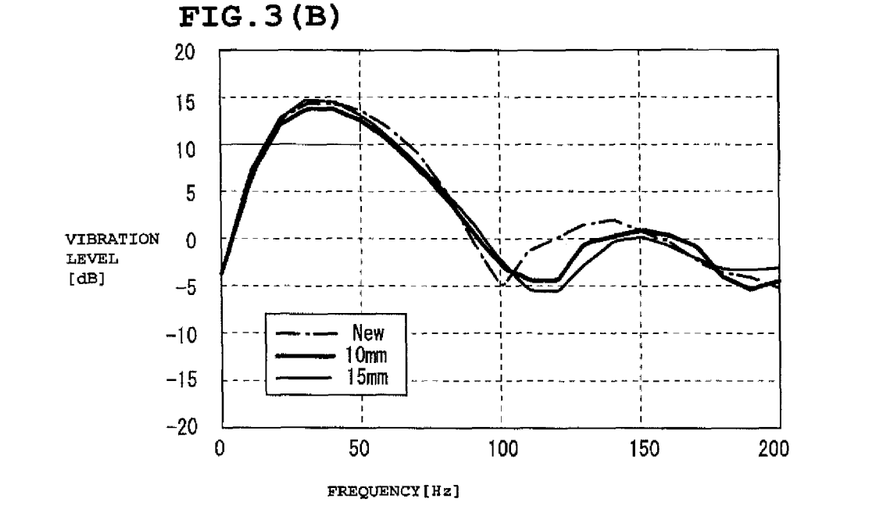

The frequency analysis means 16 performs a frequency analysis by FFT on the acceleration waveform in the time domain from a point before the leading edge to a point after the trailing edge enclosed by a thick chain line in FIG. 3A, out of the acceleration waveform extracted by the acceleration waveform extracting means 15, and thereby obtains a frequency spectrum (vibration spectrum) of the acceleration waveform as shown in FIG. 3B. The horizontal axis of the frequency spectrum is frequency (Hz), and the vertical axis thereof is vibration level (dB) which is the magnitude of acceleration.

Shown in this example is a frequency spectrum up to a frequency of 200 Hz which was obtained by a frequency analysis on the acceleration waveform when the vehicle speed was 40 km/hr. The chain line in the diagram represents the frequency spectrum of a vehicle running with a new tire (normal tire), whereas the thin and thick solid lines represent the frequency spectrums of the vehicle running with tires with separations (faulty tires).

Hereinbelow, a description is given of internal failures of a tire.

As shown in FIG. 2, a tire 20 is comprised of a carcass 21, beads 22, a belt 23, a tread 24, and an inner liner 25.

The carcass 21, which is a toroidal framework member of the tire 20, straddles a pair of bead cores 22C disposed in their respective beads 22. The belt 23 is disposed radially outside of the crown area of the carcass 21. The belt 23 consists of a first belt layer 23a located on the radially inner side and a second belt layer 23b located on the radially outer side. The first belt layer 23a and the second belt layer 23b are each made of steel cords or woven cords of organic fiber crossing each other at angles of 20 to 70 degrees with respect to the equatorial plane of the tire. And the first belt layer 23a is formed with a width wider than that of the second belt layer 23b. The extension direction of the cords of the first belt layer 23a and that of the cords of the second belt layer 23b cross each other.

The tread 24, which is a rubber layer disposed radially outside of the belt 23, has a tread pattern formed on its surface. Hereinbelow, of the circumferential grooves formed on the surface of the tread 24 and extending circumferentially around the tire, the circumferential grooves located in axially outermost positions will be referred to as shoulder grooves 24a and 24b. And the area axially inside of the shoulder grooves 24a and 24b will be referred to as the tread center area 26, and the areas axially outside thereof as the shoulder areas 27.

The inner liner 25 is a sheet of a rubber-like material disposed on a radially inner side of the carcass 21. The acceleration sensor 11 is attached to the inner liner 25.

Figure 4:
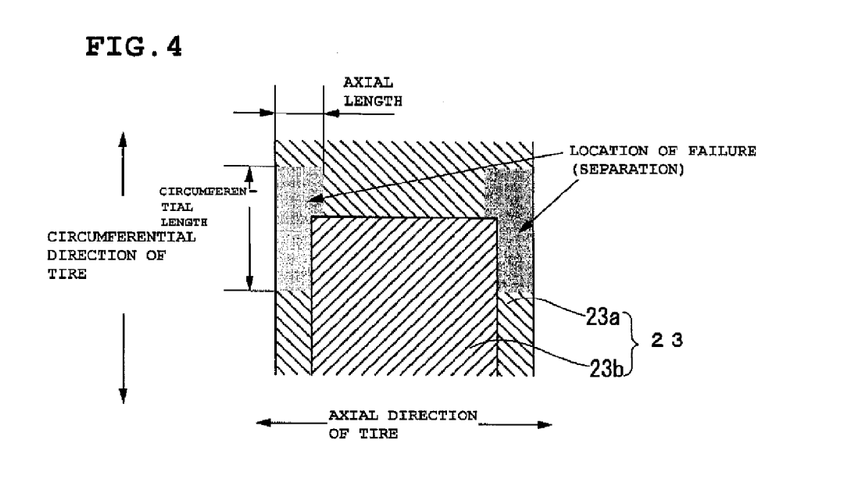
FIG. 4 is an illustration showing locations where a separation can occur.

In a tire 20, "socketing", in which a crack runs in the rubber with a peel-off of coating rubber from a cord end, mainly occurs at the end portions of the first and second belt layers 23a and 23b. This will eventually grow into a separation between the first belt layer 23a and the second belt layer 23b in the shoulder areas 27 as shown in FIG. 4. The separation can spread in both circumferential and axial directions of a tire.

With a separation between the end portion of the first belt layer 23a and the end portion of the second belt layer 23b, the bond of the belt 23 with the shoulder areas 27 will be lost, which will lead to a drop in rigidity of the shoulder areas 27. As a result, it is assumed that the ground contact length of the shoulder areas 27 gets longer and the ground contact length of the tread center area 26 gets shorter.

Figure 5A:
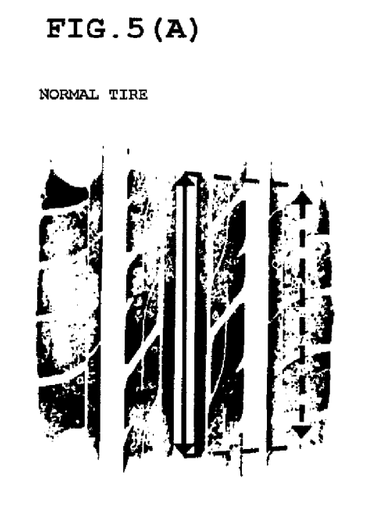
FIG. 5 shows footprints of a normal tire and a faulty tire.
Figure 5B:
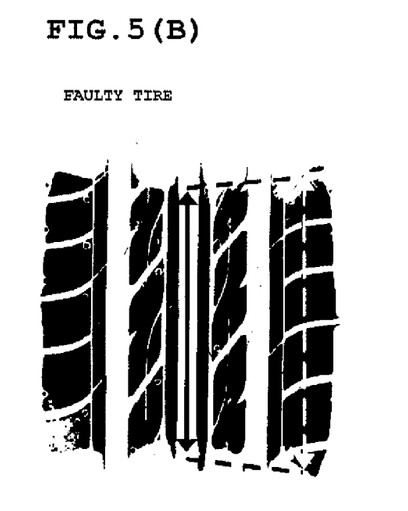

FIGS. 5A and 5B show footprints of a tire without any internal failure such as a separation (normal tire) and a tire with a separation (faulty tire). The footprint of a normal tire shown in FIG. 5A shows the ground contact length of the center area longer than that of the shoulder areas, whereas the footprint of a faulty tire shown in FIG. 5B show the ground contact length of shoulder areas longer than that of the center area.

This is considered attributable to the drop in rigidity of the shoulder areas 27 which has resulted from the loss of bond of the belt 23 with the shoulder areas 27 due to a separation at the end portion of the first belt layer 23a or the second belt layer 23b. As the ground contact length of the shoulder areas gets longer, the center area 26 develops a buckling, or an inward depression, and consequently the ground contact length thereof gets shorter.

As described above, the ground contact length of the tread center area gets shorter because the radially outward swell of the tire is reduced by a separation. And the result is lowered peak levels of the bulge points in the radial acceleration waveform of faulty tires. Therefore, it is possible to accurately determine whether there is an internal failure of a tire by a process of detecting the vibrations of the tire 20 in the tread center area 26 during vehicular travel, calculating a band value of a frequency band including the frequency corresponding to the second lowest peak of the peaks appearing in the frequency spectrum derived by performing a frequency analysis on the radial acceleration of the tire as shown in FIG. 3B, and comparing this calculated band value against a predetermined band value of a normal tire.

The band value calculating means 17 calculates a band value, which is a magnitude of vibrational components in a specific frequency band, from a frequency spectrum obtained by the frequency analysis means 16. The specific frequency band is the frequency band including the frequency of the second highest peak of the peaks appearing in the frequency spectrum derived by performing a frequency analysis on the radial acceleration. The specific frequency band is within the range of 100 Hz to 400 Hz, although it varies with the vehicle speed. In the example of FIG. 3B, since the vehicle speed is 40 km/hr, the band value $X_{ab}$ is calculated by setting $[f_a, f_b]=$ [100 Hz, 200 Hz] as the specific frequency band for the calculation of the band value. In the present embodiment, the specific frequency band is set as [150 Hz, 300 Hz] for the vehicle speed of 60 km/hr and [200 Hz, 400 Hz] for the vehicle speed of 80 km/hr.

In the frequency spectrum of FIG. 3B, all the tires tested show the first peak at 30 Hz to 40 Hz and the second peak at 130 Hz to 140 Hz. The second peak is the peak corresponding to the peak frequencies near the bulge points of the radial acceleration waveform of the tire.

The band value is calculated as an overall value of frequency points within a band. More specifically, if the specific frequency band is denoted by $[f_a, f_b]$, the number of samplings by N, and the vibration level of the frequency points (k) by $A_k$, the band value $X_{ab}$ can be calculated by the following equation:

$$X_{ab} = 10\log_{10}\left(\sum_{k=1}^{N} A_k^2\right) \quad \text{[Equation 1]}$$

Note that a mean value of the frequency points within the band can be used as the band value also.

The failure determining means 18 makes a check to see whether the band value $X_{ab}$ calculated by the band value calculating means 17 has dropped from the predetermined band value $Y_{ab}$ of a normal tire or not and determines the presence of an internal failure, such as a separation, in the tire 20 during vehicular travel when the band value $X_{ab}$ is lower than the band value $Y_{ab}$.

Figure 6A:
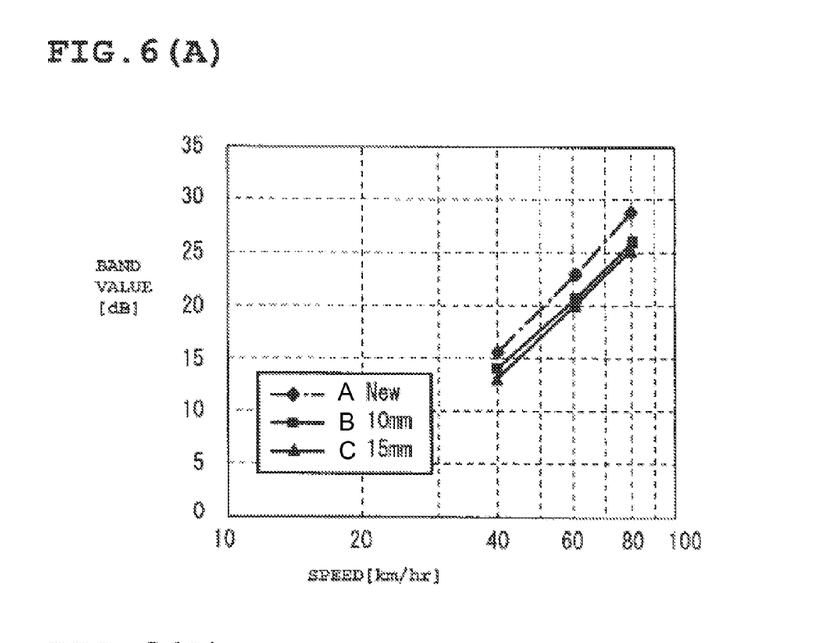
FIG. 6 is diagrams showing relationships between the size of separation and the band value.
Figure 6B:
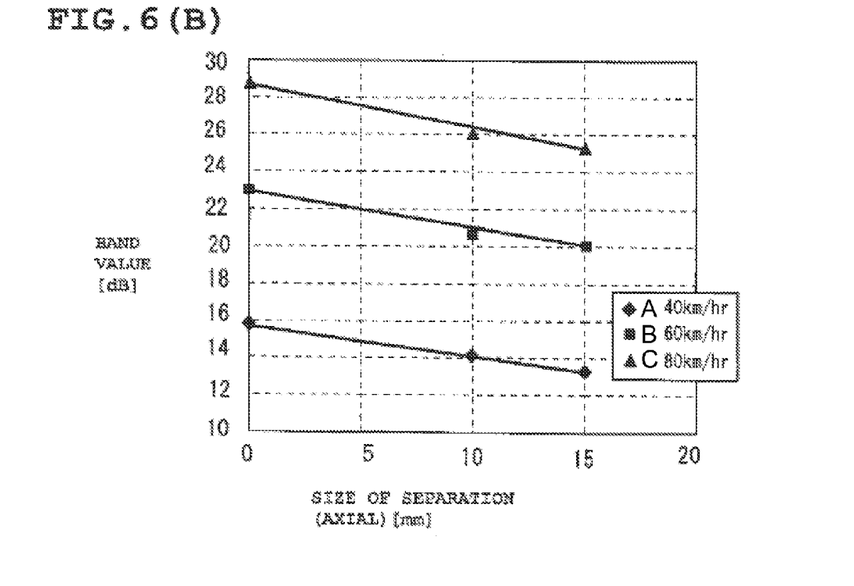

FIGS. 6A and 6B are diagrams showing relationships between the size of separation and the band value. It is evident that the larger the size of separation, the lower the band value will be. That is, when the faulty tire 20B is a tire with 10 mm of separation in the axial direction and the faulty tire 20C is a tire with 15 mm of separation in the axial direction, all of the band value $X_{ab}$ (A) of the normal tire, the band value $X_{ab}$ (B) of the faulty tire 20B, and the band value $X_{ab}$ (C) of the faulty tire 20C rise as the vehicle speed rises. And the band value $X_{ab}$ (B) of the faulty tire 20B is about 2 dB lower than the band value $X_{ab}$ (A) of the normal tire regardless of the vehicle speed. Further, the band value $X_{ab}$ (C) of the faulty tire 20C is about 1 dB lower than the band value $X_{ab}$ (B) of the faulty tire 20B.

Therefore, a threshold K is set, and when $Y_{ab}-X_{ab}>K$, it is determined that an internal failure, such as a separation, is present in the tire.

Also, the arrangement may be such that a plurality of thresholds $K_1$ and $K_2$ ($K_1<K_2$) are set, and when $K_2Y_{ab}-X_{ab}>K_1$, it is determined that a separation has occurred, and when $Y_{ab}-X_{ab}>K_2$, it is determined that a separation is in progress.

Furthermore, when it is determined that an internal failure of the tire has occurred, a signal indicating the presence of an internal failure (failure signal) is outputted to the alarm means 19.

The alarm means 19, which is installed near the driver's seat, warns the driver about the presence of an internal failure of a tire by lighting or blinking the alarm LED when the failure signal is inputted. It should be noted that the driver may be warned about the presence of an internal failure by the sounding of an alarm buzzer or a combination of an alarm buzzer and LED.

Next, a description is given of a method for determining an internal failure of a tire using a tire internal failure determining apparatus.

First, tread vibrations in the radial direction of a tire 20 during vehicular travel are detected by an acceleration sensor 11, and the detection signals are transmitted from a transmitter 12 to receiver 14 on the vehicle body. At the same time, the wheel speed is detected by a wheel speed sensor 13, and the data on the detected wheel speed is outputted to an arithmetic unit 10Z.

The output signals of the acceleration sensor 11 received by the receiver 14 are inputted to the arithmetic unit 10Z. The arithmetic unit 10Z extracts an acceleration waveform as shown in FIG. 3A from the output signals of the acceleration sensor 11 and obtains a frequency spectrum of the acceleration waveform as shown in FIG. 3B by performing a frequency analysis on the extracted acceleration waveform.

Then a band value $X_{ab}$ of a specific frequency band $[f_a, f_b]$ is calculated from the obtained frequency spectrum. A check is made to see whether or not the difference between the calculated band value $X_{ab}$ and a predetermined band value $Y_{ab}$ of a normal tire exceeds a threshold K. And when $Y_{ab}-X_{ab}>K$, it is determined that an internal failure, such as a separation, is present in the tire.

When it is determined that an internal failure of the tire has occurred, a failure signal is outputted to warn the driver of the presence of an internal failure of a tire.

Thus, according to the present embodiment, radial acceleration signals of a tire during vehicular travel are detected by an acceleration sensor 11 attached to the inner surface of the tire at the axial center of the tread, and a frequency analysis is performed on the radial acceleration signals to obtain a frequency spectrum. Then a band value $X_{ab}$ is calculated of a specific frequency band $[f_a, f_b]$ within the range of 100 Hz to 400 Hz, which includes the frequency of the second lowest peak of the peaks appearing in the frequency spectrum. Now a check is made to see whether or not the difference between this band value $X_{ab}$ and a predetermined band value $Y_{ab}$ of a normal tire exceeds a threshold value K. And when $Y_{ab}-X_{ab}>K$, it is determined that an internal failure, such as a separation, is present in the tire. Therefore, it is possible to accurately determine whether an internal failure of a tire has occurred or not without affecting the tire behaviors. This will improve the running safety of the vehicle.

In the previously described exemplary embodiment, the specific frequency band is set based on the data of wheel speed detected by the wheel speed sensor 13. However, the wheel speed sensor 13 is not an essential element of the present invention. That is, the wheel speed sensor 13 can be excluded if the leading-edge peak interval or the trailing-edge peak interval is found from the output of the acceleration sensor 11 and the wheel speed is determined using this peak interval and the diameter of the tire.

Or the frequency f of the second lowest peak of the peaks appearing in the frequency spectrum of the radial acceleration may be detected, and the frequency band $[f-\Delta f, f+\Delta f]$ ($\Delta f$ being about 50 Hz), of which the frequency f is the center frequency, may be used as the specific frequency band.

Also, in the foregoing embodiment, a description has been given of cases where a separation has occurred on both axial sides of a tire. But the detection can be made even when a separation has occurred only on one side of the tire.

Figure 7:
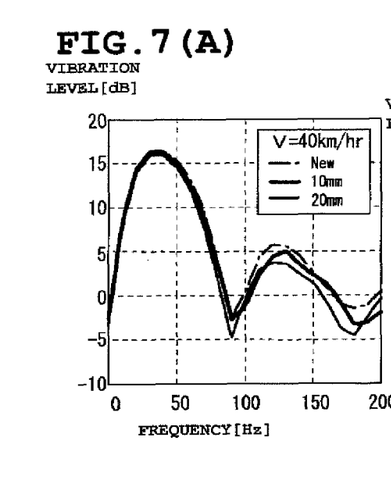
FIG. 7 is diagrams showing frequency spectrums of acceleration waveforms when a separation is occurring on one side of a tire only.

FIGS. 7A to 7C are diagrams showing the frequency spectrums of normal tire 20A, faulty tire 20B with 10 mm of separation, and faulty tire 20D with 20 mm of separation when the vehicle speed is 40 km/hr, 60 km/hr, and 80 km/hr, respectively.

In this case, as with the case already described, the frequency of the second highest peak is near 120 Hz when the vehicle speed is 40 km/hr. Therefore, a band value X may be calculated for a specific frequency band of [100 Hz, 200 Hz], and the band value X may be compared against the band value Y of the normal tire. Also, the frequency of the second highest peak is near 180 Hz when the vehicle speed is 60 km/hr and near 240 Hz when the vehicle speed is 80 km/hr. Therefore, the band value X may be calculated for the specific frequency bands of [150 Hz, 300 Hz] and [200 Hz, 400 Hz], respectively.

Figure 8A:
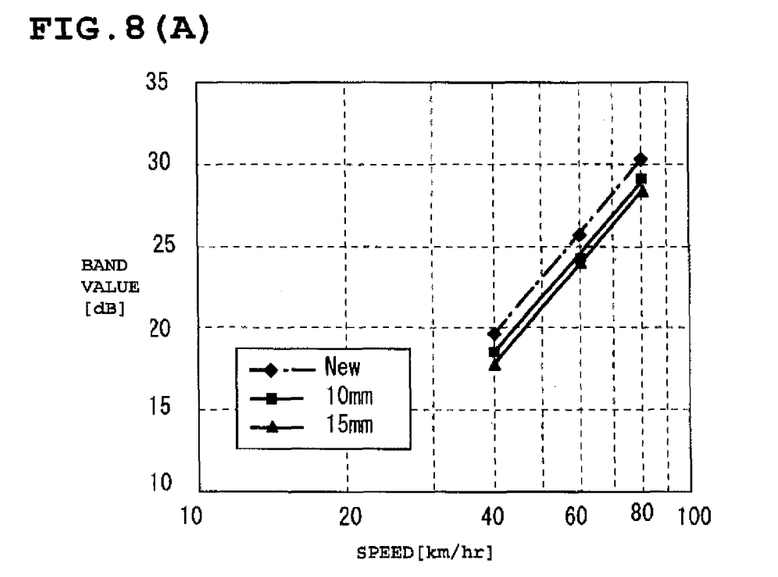
FIG. 8 is diagrams showing relationships between the size of separation and the band value when a separation is occurring on one side of a tire only.
Figure 8B:
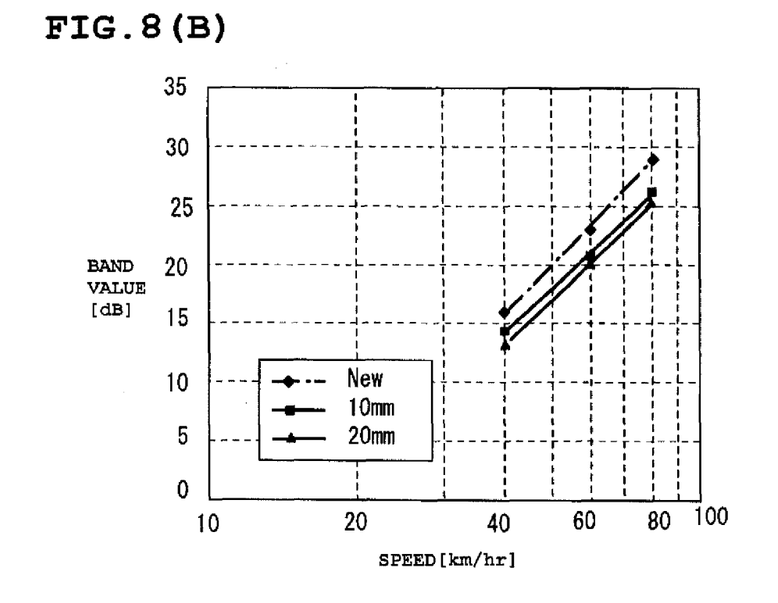

When a separation is occurring on one side of the tire only, the difference between the band value Y of normal tire 20A and the band values X of faulty tires 20B and 20D as shown in FIG. 8A is smaller than the difference between the band value Y of normal tire 20A and the band values X of faulty tires 20B and 20D as shown in FIG. 8B. However, the data suffices for the estimation of the occurrence of a separation.

Thus, it is possible to detect the occurrence of a separation on one side of a tire even when an acceleration sensor 11 is located at the axial center of the tread. Also, two acceleration sensors 11 may be prepared and attached in the tread center area 26, each of them axially outward from the axial center, for the detection of tread vibrations radially inputted from the road surface. Then the accuracy of estimation of the occurrence of a separation can be further enhanced.

Also, in the foregoing embodiment, a frequency spectrum is obtained by performing a frequency analysis on an acceleration waveform from a point before the leading edge to a point after the trailing edge of ground contact of a tire. However, the presence or absence of a separation may be determined by calculating a band value using a frequency spectrum after running a frequency analysis on the acceleration waveform of the leading-edge region including the leading-edge bulge point or a frequency spectrum after running a frequency analysis on the acceleration waveform of the trailing-edge region including the trailing-edge bulge point as shown in FIG. 10.

As described above, use of the time domain including the vibrations near the bulge point of an acceleration waveform only will produce a marked difference between the band values. And this will improve the accuracy of determining internal failures of a tire.

It should be noted that the sum of a leading-edge side band value and a trailing-edge side band value may also be used as reference for the determination.

EXAMPLE

An acceleration sensor was installed inside each of the tires with internal failure (faulty tires). Those tires were fitted on a test vehicle, and the vehicle was operated for this testing. The band values X were obtained from the frequency spectrums of the tire vibrations and compared with the band value of new tires (normal tires) on the running test vehicle. The tire size was 195/65R15, and the vehicle speed was 40 to 80 km/hr.

The results are shown in FIG. 6 and FIG. 8.

As is evident in FIG. 6 and FIG. 8, the band values of the faulty tires were lower than the band value of the normal tire irrespective of the vehicle speed. Therefore, it was clear that the presence or absence of internal failure, such as a separation, of a tire can be determined with certainty by setting the threshold K.

It was also confirmed that with the spread of a separation, the band value of the faulty tire drops further.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

INDUSTRIAL APPLICABILITY

According to the present invention, it is possible to accurately determine internal failures of tires without affecting the tire behaviors. This will improve the safety of vehicular operation.

DESCRIPTION OF REFERENCE NUMERALS 10 tire internal failure determining apparatus
10Z arithmetic unit
11 acceleration sensor
transmitter
13 wheel speed sensor
14 receiver
15 acceleration waveform extracting means
16 frequency analysis means
17 band value calculating means
18 failure determining means
19 alarm means
20 tire
21 carcass
22 bead
22C bead core
23 belt
23a first belt layer
23b second belt layer
24 tread
24a, 24b shoulder groove
25 inner liner
26 tread center area
27 shoulder area

The invention claimed is:

1. A method for determining an internal failure of a tire, comprising the steps of:
    detecting radial acceleration of a tire during vehicular travel by an acceleration sensor installed on an inner surface of the tire in a tread center area;
    calculating a band value, which is a magnitude of vibrational components in a specific frequency band, from the detected radial acceleration;
    comparing the calculated band value against a predetermined band value of a normal tire; and
    determining the presence of an internal failure of the tire when the calculated band value is smaller than the band value of the normal tire,
    wherein the specific frequency band is a frequency band which includes the frequency of the second lowest peak of the peaks appearing in the frequency spectrum derived by performing a frequency analysis on the radial acceleration.

2. The method for determining an internal failure of a tire according to claim 1, wherein the specific frequency band is within a range of 100 Hz to 400 Hz.

3. The method for determining an internal failure of a tire according to claim 2, wherein the specific frequency band is changed relative to the vehicular speed.

4. The method for determining an internal failure of a tire according to claim 1, wherein the band value is either one of a leading-edge side band value, calculated from a time-series waveform of the leading-edge region which includes a leading-edge peak occurring when the tire engages with the ground, and a trailing-edge side band value, calculated from a time-series waveform of the trailing-edge region which includes a trailing-edge peak occurring when the tire disengages from the ground, or the sum of the leading-edge side band value and the trailing-edge side band value, of the time-series waveform of the radial acceleration.

5. The method for determining an internal failure of a tire according to claim 2, wherein the band value is either one of a leading-edge side band value, calculated from a time-series waveform of the leading-edge region which includes a leading-edge peak occurring when the tire engages with the ground, and a trailing-edge side band value, calculated from a time-series waveform of the trailing-edge region which includes a trailing-edge peak occurring when the tire disengages from the ground, or the sum of the leading-edge side band value and the trailing-edge side band value, of the time-series waveform of the radial acceleration.

6. The method for determining an internal failure of a tire according to claim 3, wherein the band value is either one of a leading-edge side band value, calculated from a time-series waveform of the leading-edge region which includes a leading-edge peak occurring when the tire engages with the ground, and a trailing-edge side band value, calculated from a time-series waveform of the trailing-edge region which includes a trailing-edge peak occurring when the tire disengages from the ground, or the sum of the leading-edge side band value and the trailing-edge side band value, of the time-series waveform of the radial acceleration.

* * * * *